United States Patent [19]

Patton

[11] Patent Number: 5,351,634
[45] Date of Patent: Oct. 4, 1994

[54] GRASS PLANTER

[76] Inventor: John E. Patton, 321 Norwood Rd., Silver Spring, Md. 20905

[21] Appl. No.: 967,115

[22] Filed: Oct. 27, 1992

[51] Int. Cl.⁵ .............................................. A01C 5/06
[52] U.S. Cl. ...................................... 111/77; 111/901
[58] Field of Search ............... 111/901, 902, 918, 924, 111/77, 177, 170; 221/203, 277; 222/613, 623, 236, 237, 226

[56] References Cited

U.S. PATENT DOCUMENTS

| | | |
|---|---|---|
| 1,109,711 | 9/1914 | Spore et al. |
| 1,190,849 | 7/1916 | Berriman |
| 2,258,626 | 10/1941 | Satrom |
| 2,715,882 | 8/1955 | Overstreet, Jr. |
| 2,739,549 | 3/1956 | Taylor |
| 2,889,959 | 6/1959 | Landgraf |
| 3,122,111 | 2/1964 | Taylor, Sr. ............. 111/902 |
| 3,673,970 | 7/1972 | Hatcher |
| 3,841,529 | 10/1974 | Hatcher ................ 221/203 |
| 3,905,313 | 9/1975 | Grether |
| 3,939,785 | 2/1976 | Duffy ................... 111/901 |
| 4,043,281 | 3/1977 | Sorlie et al. ............ 111/902 |
| 4,043,404 | 8/1977 | Sorlie et al. ............ 111/902 |
| 4,088,083 | 5/1978 | Dail, Jr. et al. ......... 111/901 |
| 5,035,190 | 7/1991 | Grimes |

Primary Examiner—Randolph A. Reese
Assistant Examiner—Spencer Warnick
Attorney, Agent, or Firm—Nies, Kurz, Bergert & Tamburro

[57] ABSTRACT

A grass planting apparatus which is adapted for connection to a tractor or other motor vehicle and which is well suited for no till operation in the planting of warm season and other Grasses is disclosed. In one embodiment, the apparatus includes a frame having mounted thereon a forward set of cutting coulters, a rear set of planting coulters and a set of furrowers positioned at the mid-portion of the frame. The planting coulters are employed in conjunction with a set of agitator feeders which may be in the form of elongated kicker tines. A feeder trough for the grasses to be planted has openings therein to receive the planting coulters and for passage of the grass materials through the bottom of the trough.

22 Claims, 7 Drawing Sheets

GRASS PLANTER

BACKGROUND AND SUMMARY OF THE INVENTION

The present invention relates to a grass planter apparatus. More particularly, the present invention relates to a grass planter which is constructed to provide for "no till" operation in the planting of warm season grasses, being highly maneuverable so as to be especially useful for operations such as grass planting on golf courses.

Previous apparatus for use in planting grass is described, for example, in the following U.S. patents: U.S. Pat. No. 1,109,711 to Spore et al.; U.S. Pat. No. 1,190,849 to Berriman; U.S. Pat. No. 2,258,626 to Satrom; U.S. Pat. No. 2,715,882 to Overstreet, Jr.; U.S. Pat. No. 2,739,549 to Taylor; U.S. Pat. No. 2,889,959 to Landgraf; U.S. Pat. No. 3,673,970 to Hatcher; U.S. Pat. No. 3,905,313 to Grether; and U.S. Pat. No. 5,035,190 to Grimes.

By the present invention there is provided a grass planter or turfgrass sprigger which is particularly well suited for warm season turfgrass planting. The apparatus of the present invention may be advantageously employed for planting turfgrass stolons, i.e., a plant stem having nodes which take root to form new plants, in existing turf in order to replace such turf with another species with minimal damage to the turf surface. The no till operation of the invention causes little damage to existing cool season turf while planting. In one embodiment, the machine plants a five foot swath and the rows are six inches apart. In this embodiment, the machine is about seven feet wide by fifty-five inches long and it works off a three point hitch operated by a forty-five to sixty horsepower tractor. The present machine is highly maneuverable and can be picked up by use of the tractor and lowered into place for planting around tight spots in close proximity to greens, sandtraps, trees and the like. The machine of the present invention is also highly effective on slopes and hillsides.

The present machine is fully adjustable for different depths and soil conditions including wet, dry and sandy conditions. In one embodiment, it has a row of eight sharp cutting coulters or disks in the front portion of the machine. These coulters penetrate three or four inches into the soil, cutting slits and slicing through roots to allow the furrower teeth which follow to travel through the soil without interruption. The furrower teeth separate the turf approximately two inches, undercutting it and allowing for proper insertion of the grass such as Bermuda stolon. This allows good soil contact and ensures a good catch which then requires less water when it is covered with soil. The furrower teeth are followed by a set of planting disks or coulters, of a size such as about eight inches in diameter and one-half inch in thickness. These latter coulters are serrated or notched and rotate through a compartmented feeder trough containing the turfgrass stolons, picking up the stolons inside the trough and pulling them out through an opening in the bottom.

The grass planter apparatus of the present invention also has agitators or kickers of a spoke-shaped configuration which rotate through the feeder trough and feed the planter coulters with the stolons to ensure a proper, uniform installation. On either side of each planter coulter there is positioned a roller, having a width of approximately 1½ inches. These rollers extend approximately two inches from the edge of the coulters. These rollers press the soil down and seal in the stolons which have been installed by the coulters running through the feeder trough. At the rear of the machine is mounted a light, free-floating roller which has a floating action to allow the machine to travel over uneven ground. This roller presses the turf firmly enough to groom the area without heavy compacting and provides a smooth surface after the previous planting operation.

DESCRIPTION OF THE PREFERRED EMBODIMENTS

Figure 1:
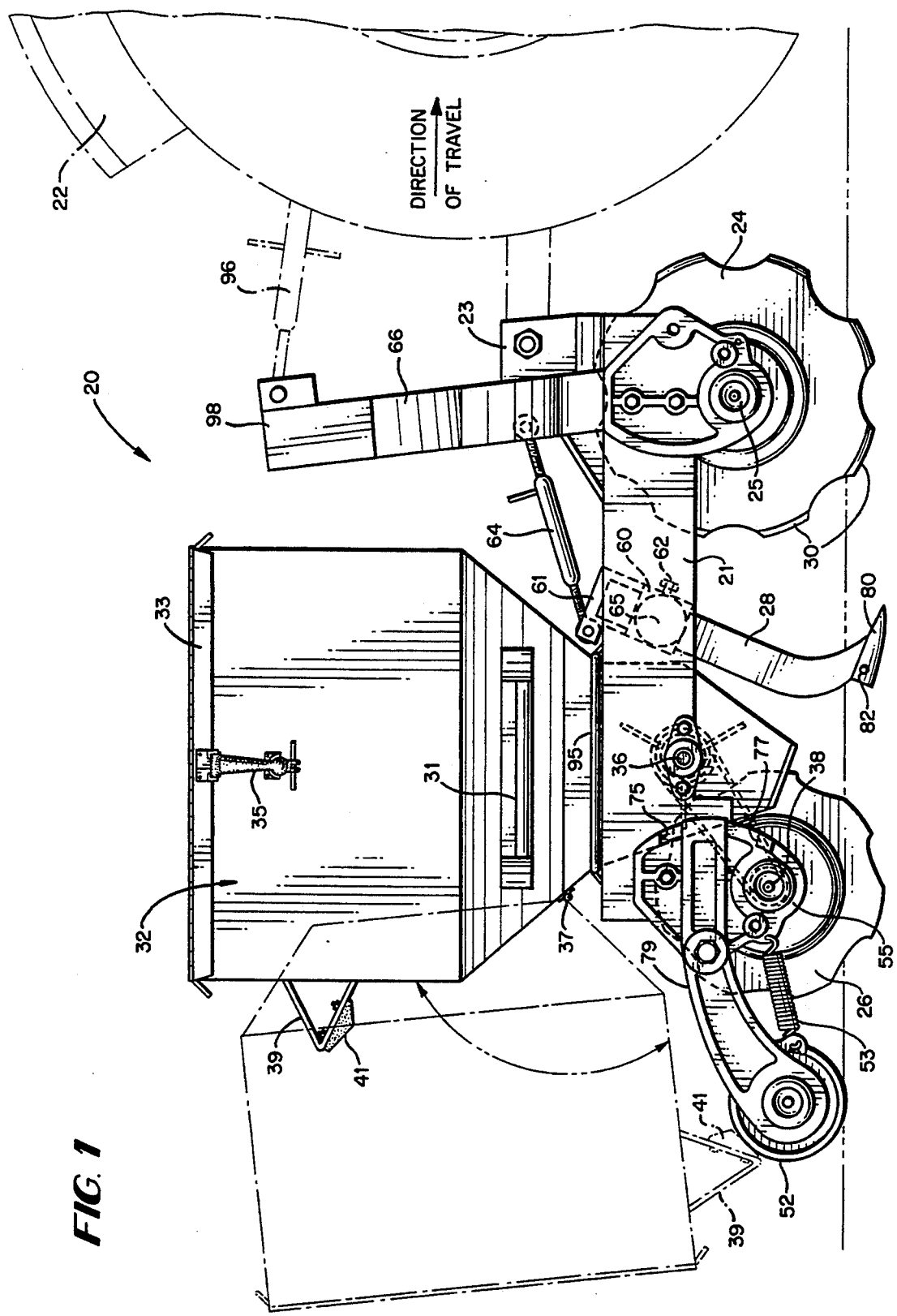
FIG. 1 is a side elevation showing the grass planter of the present invention.

In the embodiment of the invention as shown in FIGS. 1 through 10, there is provided a grass planter 20 for installation behind a tractor 22. The planter 20 includes a forward set of cutting coulters or disks 24 and a rear set of planter coulters 26. Positioned between these two sets of coulters 24, 26 is a set of furrowers 28. The coulters 24, 26 and furrowers 28 are mounted on a rectangular-shaped main frame which includes side members 21 and front and rear transverse members 23.

The forward coulters 24 are mounted on axle 25 and each coulter 24 is provided with sharpened blade segments 30 which slide through the root layer and cut into the soil of the existing turfgrass. These cuts are enlarged into small furrows by the furrowers 28 which travel through the cuts just below the surface. Suitable spacer members 71 are positioned between the coulters 24 to maintain them in position.

A large bin or hopper 32 is positioned above the rear coulters 26 to hold the grass stolons. The hopper 32 is provided with a pair of top doors 33 which are pivotally mounted along a center longitudinal axis so that the doors 33 can be easily raised for filling of the hopper 32. Fasteners 35 such as stretch rubber clamps are employed to maintain the doors 33 in a closed position. The hopper 32 is pivotally mounted as shown in FIG. 1, allowing the hopper 32 to be tipped rearwardly to expose the feeder trough 34 located below. A handle 31 is provided on either side to assist in operating the hopper 32. The pivot pins 37 used to mount the hopper 32 may be removed, allowing the hopper 32 to be lifted off the machine. Also, one or more arms 39 are provided on the back side of the hopper 32, with each arm 39 having a resilient member 41 for contact with the rear roller 52 when the hopper 32 is tilted backwardly, as shown in FIG. 1. The gravity fed stolons flow from the bin 32 into the narrow compartmentalized feeder trough 34 located below the bin 32 and extending across the width of the rear coulter 26 arrangement.

Each of the front 24 and rear 26 coulters rotates independently on its respective axle 25 or 38, with the coulters 24, 26 thus being operated by ground-wheel contact. The coulters 24, 26 are mounted on bushings 27, 29 with just enough friction being provided to keep the respective shafts 25, 38 rotating during operation. Since the front and back coulters rotate independently, this assists in cornering of the machine during operation, as the outside disks 24, 26 can rotate a little faster so as not to be destructive to the golf course or other area being planted.

Figure 2:
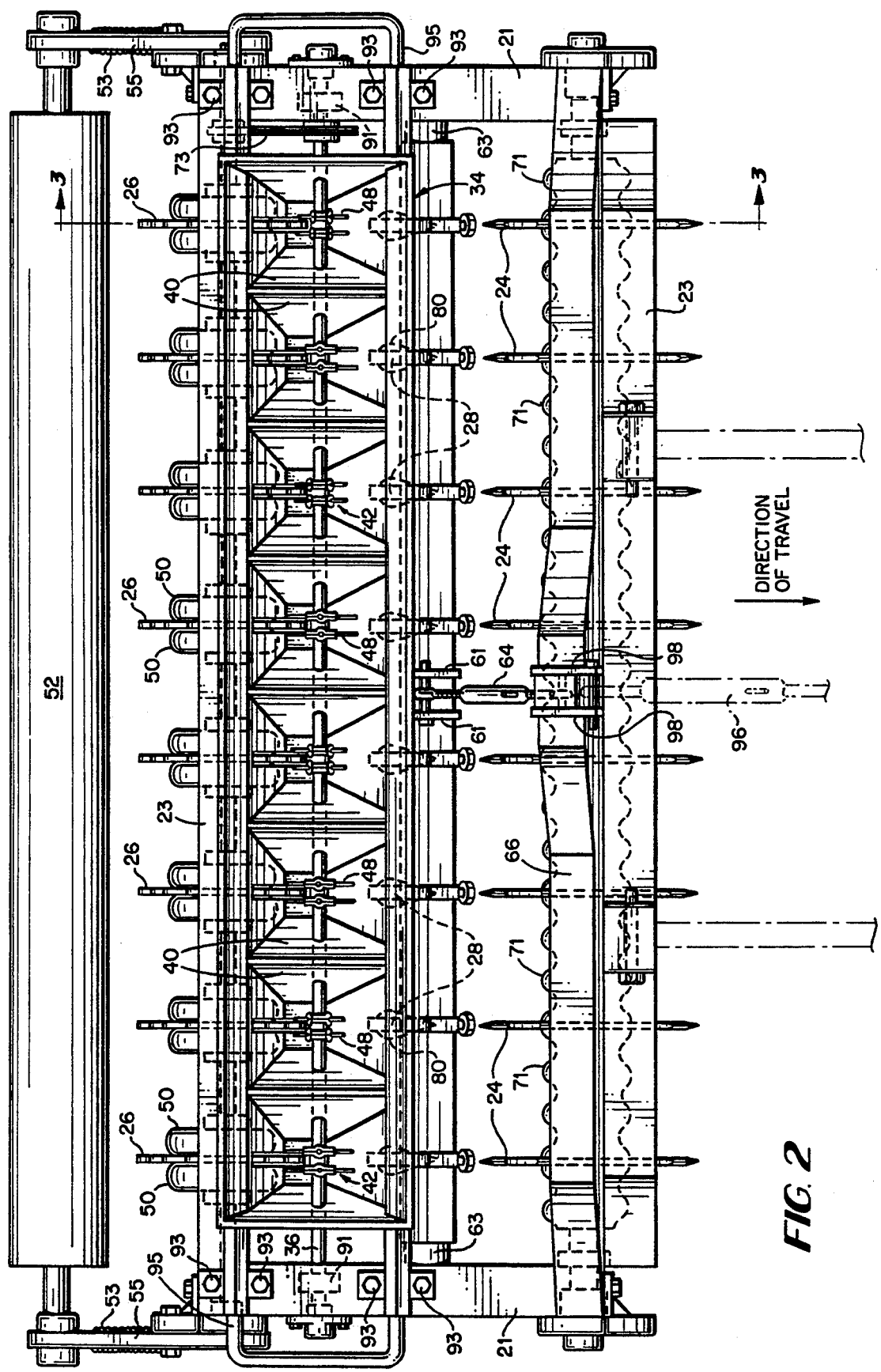
FIG. 2 is a top plan view of the rear portion of the grass planter of FIG. 1 with the hopper box removed.
Figure 3:
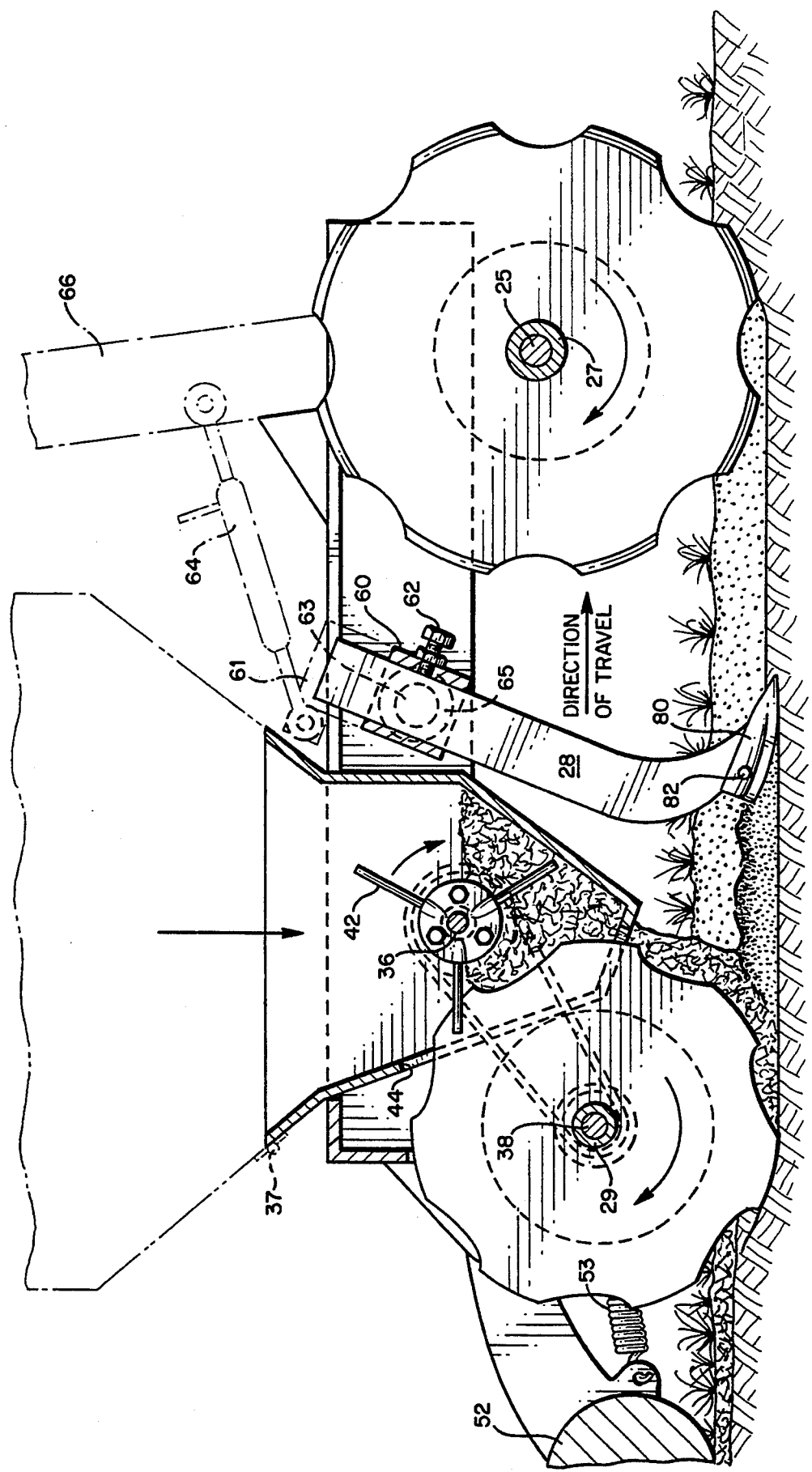
FIG. 3 is an enlarged side elevation in partial cross section of a portion of the grass planter of FIG. 1 showing the grass stolons in the feeder trough prior to planting.
Figure 9:
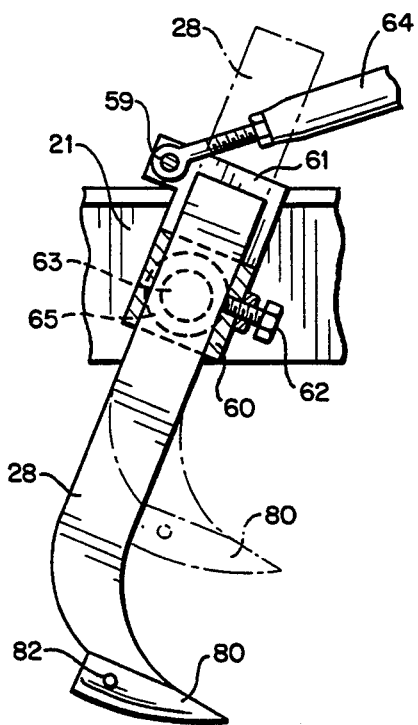
FIGS. 9 and 10 show two positions for the furrower implement as installed on the grass planter of the present invention.
Figure 10:
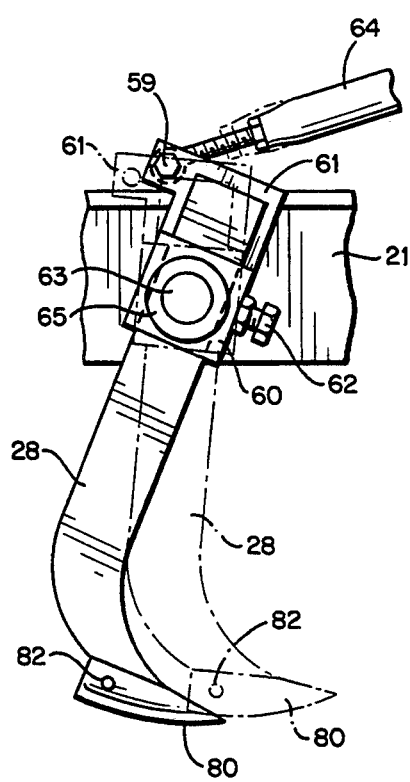

In one embodiment, as shown in FIG. 2, the furrowers 28 are in longitudinal alignment with the cutting coulters 24 and the planting coulters 26. A series of eight furrowers 28 are mounted on a horizontal mounting bracket 60 extending transversely across the width of the machine, in alignment with eight cutting coulters 24 and eight planting coulters 26. As shown in FIGS. 1 and 3, an adjusting bolt 62 is provided on the bracket 60 for each furrower 28, allowing each furrower 28 to be adjusted for height relative to the ground. In addition, as shown in FIGS. 9 and 10, a turnbuckle arrangement 64 is mounted by bolt means 59 between a pair of brackets 61 extending above the furrower bracket 60 and a vertical yoke-shaped frame member 66 which angles upwardly toward the center from either side and which extends above the cutting coulter 24 assembly, in order to allow the attitude of the furrowers 28 to be adjusted. The bracket 60 has its end portions mounted on axle members 63 extending outwardly, with each axle member 63 being mounted in a journal bearing 65 secured to a side frame member 21.

Each furrower 28 is provided with a bottom portion 80 in the shape of ears which extend outwardly to the side in a horizontal direction from furrower 28, to which the bottom portion 80 is attached by a bolt 82 with such ears being tapered inwardly to a point at the forward portion thereof. This shape of the furrowers 28 allows each furrower 28 to slide under the existing turf and undercut on each side, thus providing good soil contact for the stolons.

Figure 5:
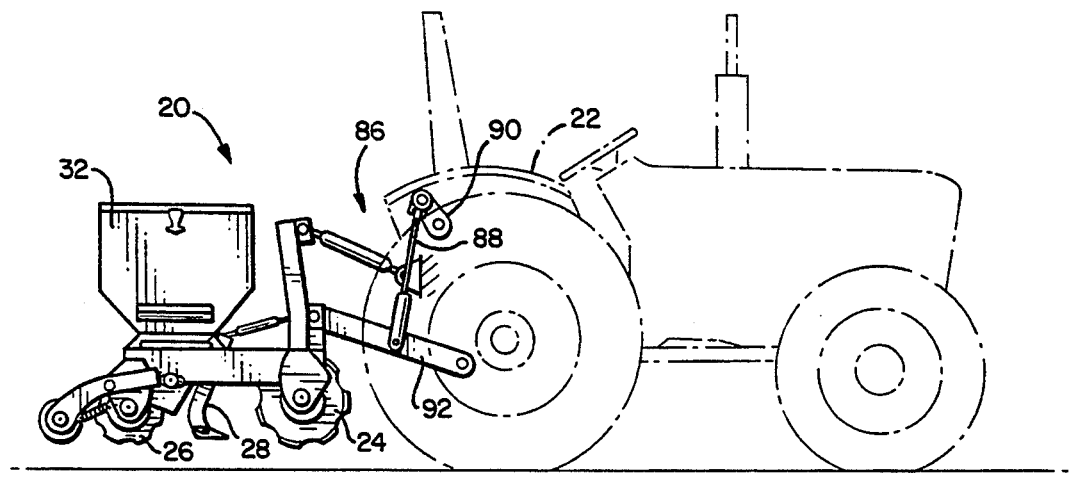
FIGS. 5 and 6 show the grass planter of the present invention in the raised and lowered or operative position, respectively, as installed on a tractor.
Figure 6:
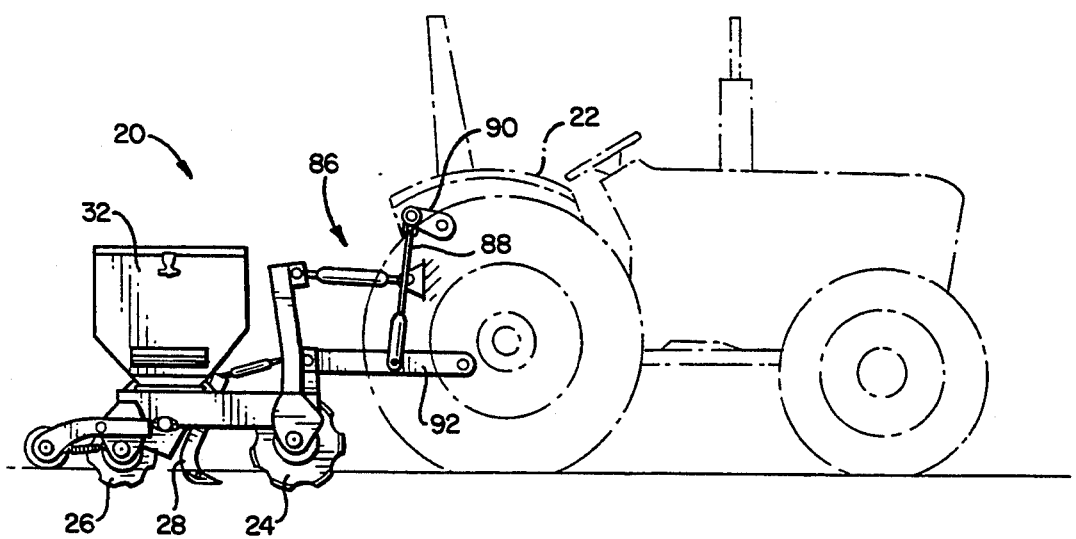

In FIGS. 5 and 6 there are shown the two positions of the planter machine 20 as operated by a three point hitch 86 having connecting rods 88 and pivot members 90, 92 on either side thereof and operating by hydraulic action to allow the machine 20 to be raised to an inoperative position as shown in FIG. 5, or for the machine 20 to be lowered to the operating position as shown in FIG. 6.

Figure 7:
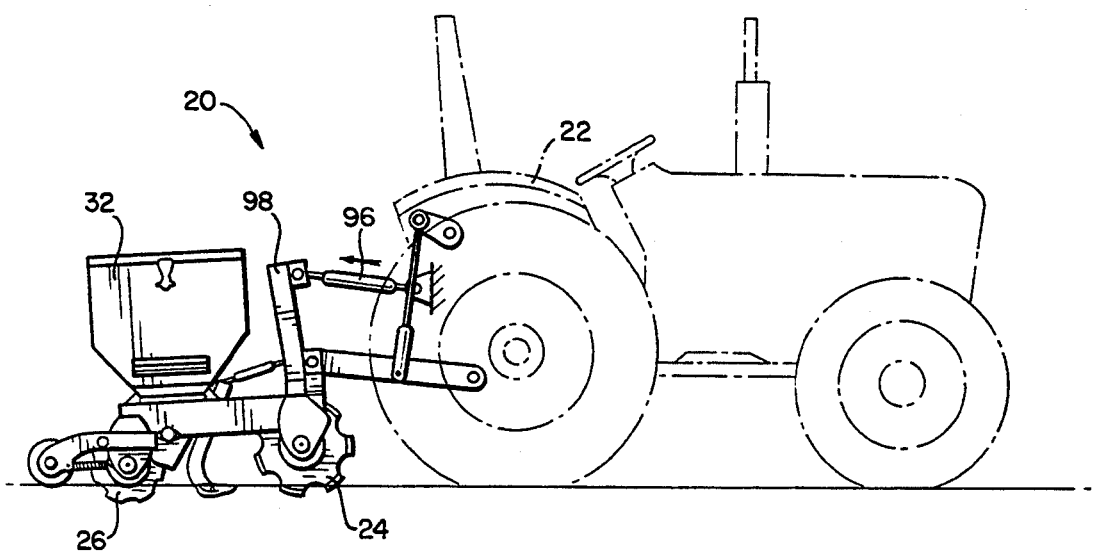
FIGS. 7 and 8 show two positions of the action by the three point hitch in controlling the cutters or coulters.
Figure 8:
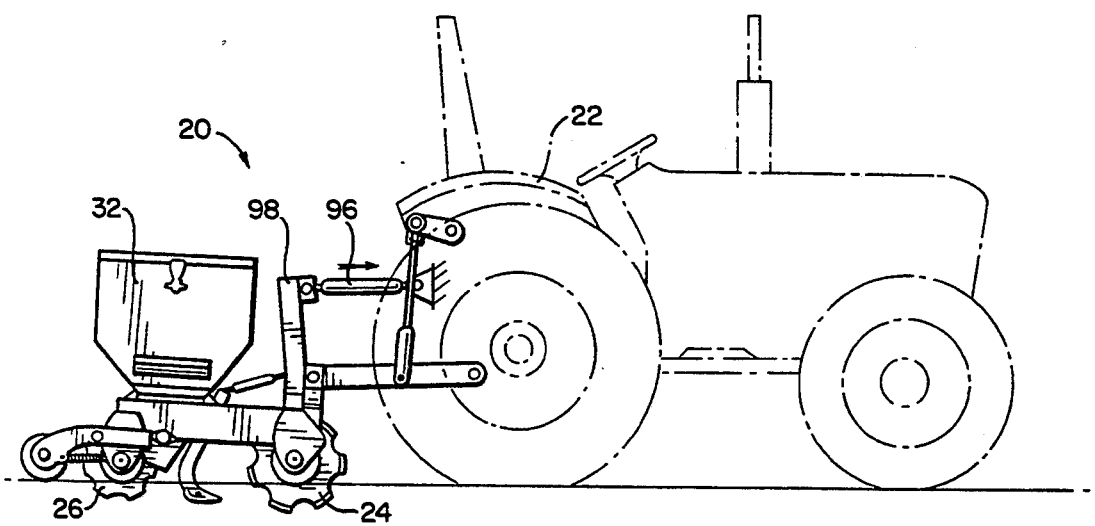

In FIGS. 7 and 8 there is shown the equipment which allows the weight of the machine 20 to be distributed so as to shift the weight either to the rear planting coulters 26, as shown in FIG. 7, or to the forward cutting coulters 24, as shown in FIG. 8. This equipment includes a turnbuckle 96 connected between the tractor and a pair of brackets 98 mounted at the upper end of frame member 66.

A continuous axle 36 which is chain driven by chain 73 from the planter wheel axle 38, passes horizontally through the feeder compartments 40 of the feeder trough 34. In one embodiment, a gear ratio is selected so that the axle 36 makes one revolution for each two revolutions of the planter axle 38, thus providing a 2:1 ratio. A dual three spoke agitator feeder 42 is positioned in each compartment 40 and mounted for rotation on the continuous axle 36.

Figure 4:
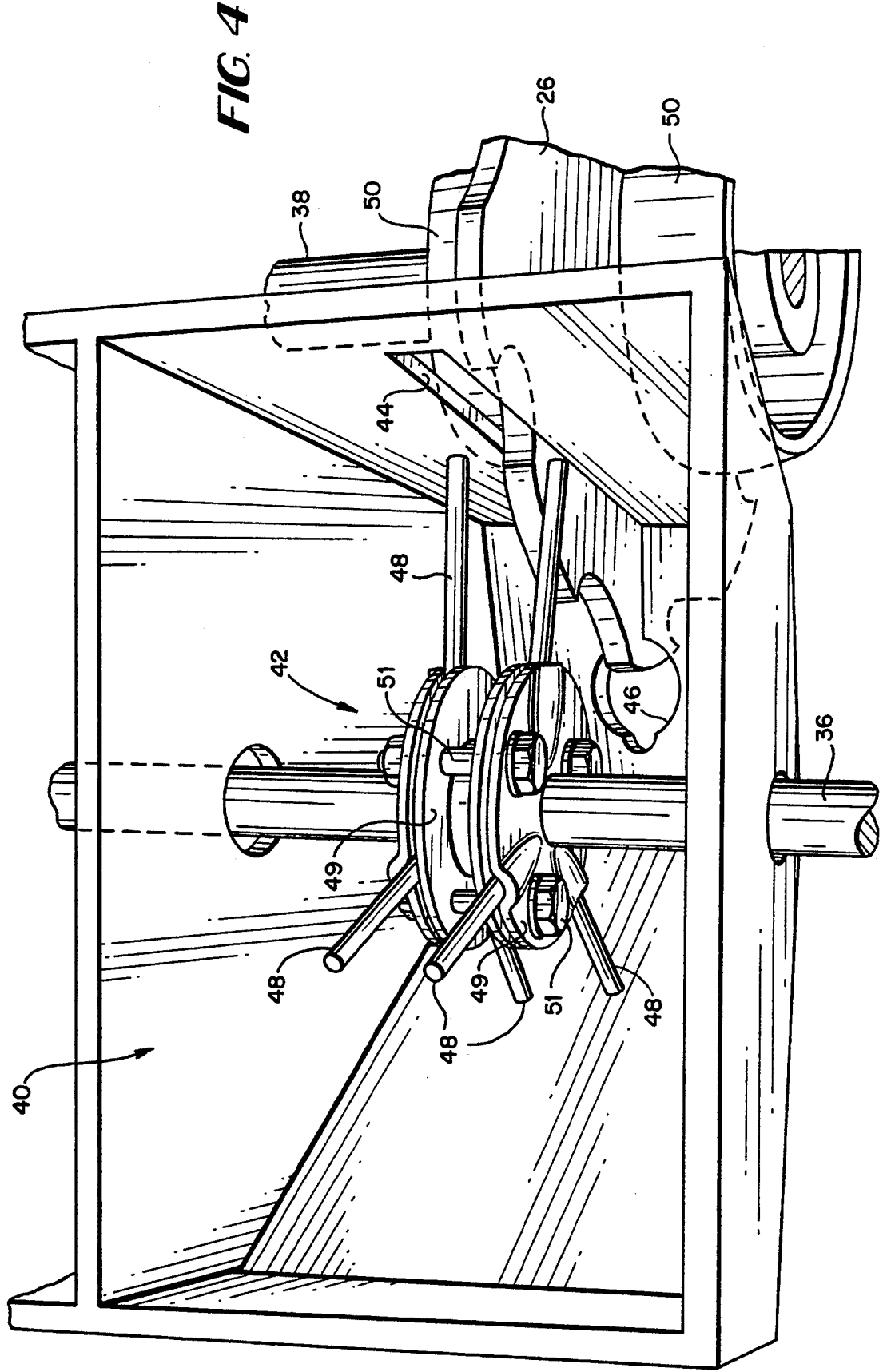
FIG. 4 is a top perspective view of the feeder trough showing the serrated coulters in relation to the kicker tines.

As shown in FIG. 4, the agitator feeder 42 includes two sets of elongated members which may be in the form of rod-shaped kicker tines or spokes in a three-spoke configuration, with each of the spokes 48 being mounted between clamping brackets 49 mounted by bolts 51 for rotation on shaft 36. In addition, each compartment 40 has an opening 44 in the rear side thereof to accommodate the travel of one of the planting wheels 26 as it penetrates the feeder compartment 40. Also, each feed compartment 40 has a flow hole 46 in the bottom. The agitator 42 is constructed so that the spokes 48 are equally spaced at 120 degree angles and pass on each side of the planter wheel 26. Each compartment agitator wheel is staggered for shaft balance.

Since the agitator 42 is rotating in the same direction as the planter wheel 26, stolons in the feeder compartment 40 are forced into the rotating toothed planter wheel 26 to be snagged and pass through the flow hole 46 in the bottom of each compartment 40.

As the stolons drop to the ground, the rotation of the planter wheel 26 embeds the stolons in the narrow furrow. Simultaneously, the smaller compression wheel 50, one located on each side of the planter wheel 26, compacts the earth on the edge of the furrow around the stolons. The coulters 26 and compression wheels 50 are maintained in position on the axle 38 by a suitable retainer ring with set screw. A small diameter roller 52 which follows the planter wheels 26 then compacts all the furrows in the swath of the machine 20. The roller 52 is maintained under tension by a spring 53 on either side, with the springs 53 being connected to the main frame members 55 adjacent the planter axle 38, as shown in FIGS. 1 and 2. Also, a pair of stops 75, 77 are provided in frame member 55 to control the movement of the roller 52 upon engaging frame member 79 of the roller 52. Due to the location of the agitators 42, the stolons are prevented from dropping out of the feeder compartments 40 during those periods when the machine is in a stationary position.

Figure 11:
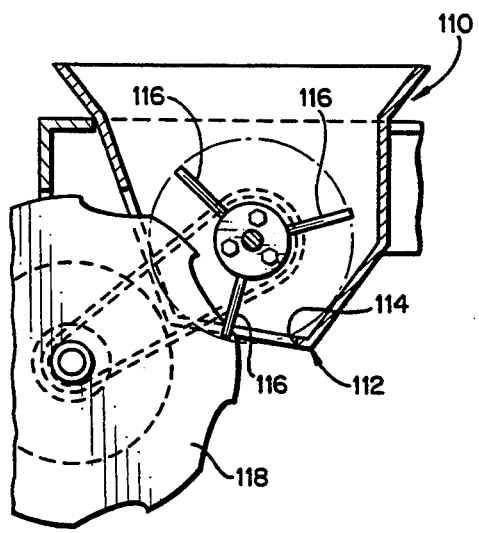
FIG. 11 is a side elevation of an alternative embodiment of the feeder trough of the present invention.
Figure 12:
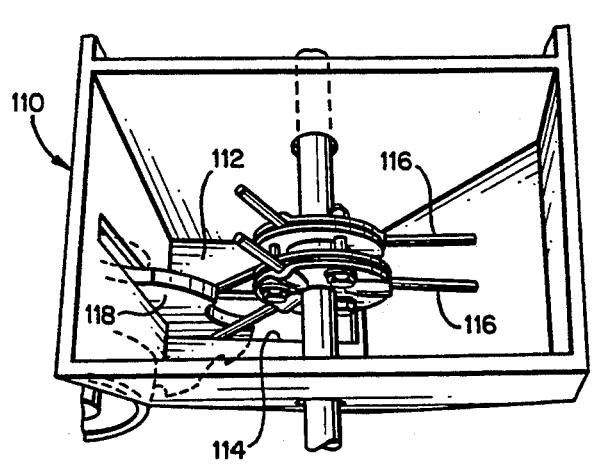
FIG. 12 is a perspective view of the feeder trough of FIG. 11.

In the embodiment of the feeder trough 110 as shown in FIGS. 11 and 12, the bottom 112 of the trough 110 is not as deep as in the embodiment of FIGS. 3 and 4. The slot 114 extends substantially the length of the bottom 112 and the agitators 116 protrude downwardly through the slot 114 during rotation. In this manner, when coarser material is being planted, the agitators 116 will assist the serrated coulters 118 by picking up the coarse material and passing it through the slot 114 for planting.

The axle shaft 36 is provided with a coupling 91 at each end which allows the shaft 36 with the attached feeder compartments 40 to be lifted out for repair and cleaning. This is accomplished by removing the bolts 93 at each end of the feeder trough 34, as shown in FIG. 2. A handle 95 at each end of the feeder trough 34 is mounted integrally with the trough 34. Thus by lifting the handles 95, the entire feeder trough 34 assembly with feeder compartments 40 and agitator feeders 42 may be lifted out.

The present invention provides a highly effective machine for planting grass, particularly the warm season grasses in which stolon material is planted in the ground. It is estimated that, by the use of the present invention, approximately 85 to 90 percent of the stolon grass materials passing through the feeder compartments are actually planted in the ground, as compared to only 10 to 20 percent by the use of previously known equipment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A grass planting apparatus for use with a tractor or other motor vehicle and which is well suited for no till operation in the planting of warm season and other grasses, comprising:
    a frame member; at least one planting coulter rotatably mounted on said frame member; a feeder through mounted on said frame member adjacent said planting coulter, said feeder trough having front and rear side walls and a bottom wall, one of said side walls having an opening therein to receive said planting coulter and with the bottom wall having an opening therein adjacent the planting coulter; and an agitator feeder having at least one elongated member rotatably mounted in said feeder trough, said agitator feeder including two sets of kicker tines, with one set of said kicker tines being mounted for rotation on one side of said planting coulter, and with the other set of said kicker tines being mounted for rotation on the other side of said planting coulter.

2. The grass planting apparatus of claim 1 wherein each set of kicker tines includes a three-spoke configuration with the spokes equally spaced at 120 degree angles.

3. The grass planting apparatus of claim 1 wherein the elongated member extends outwardly through said bottom wall opening during rotation.

4. A grass planting apparatus for use with a tractor or other motor vehicle and which is well suited for no till operation in the planting of warm season and other grasses, comprising:
    a frame member; a plurality of front cutting coulters rotatably mounted on the front portion of said frame member; a plurality of rear planting coulters rotatably mounted on the rear portion of said frame member; a feeder trough mounted on said frame member between the front and rear coulters, said feeder trough having front and rear side walls and a bottom wall, the rear side wall having openings therein to receive the planting coulters and with the bottom wall having an opening therein adjacent at least one planting coulter; an agitator feeder having at least one kicker tine being rotatably mounted in the feeder trough adjacent said at least one planting coulter, said kicker tine extending outwardly through said bottom wall opening during rotation; and means for rotating said agitator feeder.

5. The grass planting apparatus of claim 4 further including at least one furrower mounted on said frame member between the front and rear coulters.

6. The grass planting apparatus of claim 5 including a plurality of furrowers, each of which is in longitudinal alignment with the respective front and rear coulters.

7. The grass planting apparatus of claim 5 wherein said furrower is adjustable both vertically and as to attitude relative to the vertical.

8. The grass planting apparatus of claim 5 wherein the furrower has a bottom portion in the shape of a pointed cultivator with wings which extend outwardly to the side and which taper inwardly at the forward portion thereof.

9. The grass planting apparatus of claim 4 wherein each of the front and rear coulters is mounted so as to rotate independently by ground contact.

10. The grass planting apparatus of claim 4 further including a hopper mounted above said feeder trough, with the feeder trough extending transversely across the width of the rear coulters.

11. The grass planting apparatus of claim 4 wherein said agitator feeder includes two sets of kicker tines, with one set being mounted so as to rotate on each side of the respective planting coulter.

12. The grass planting apparatus of claim 4 wherein a compression wheel roller is mounted on each side of each planting coulter.

13. The grass planting apparatus of claim 4 further including a horizontal roller member mounted on said frame member rearwardly of the planting coulters.

14. The grass planting apparatus of claim 13 wherein said roller member is free floating under spring tension.

15. The grass planting apparatus of claim 4 further including means for raising and lowering the apparatus between an inoperative and an operative position.

16. The grass planting apparatus of claim 4 further including means for distributing the weight of the apparatus so as to shift the weight either to the rear planting coulters or the front cutting coulters.

17. The grass planting apparatus of claim 4 further including means for removably mounting the feeder trough on said frame member, thus allowing the feeder trough to be lifted out for cleaning or repair.

18. The grass planting apparatus of claim 4 wherein at least one of said cutting coulters has a plurality of sharpened outer blade segments, with adjacent blade segments being separated by a notch or indentation.

19. The grass planting apparatus of claim 4 wherein at least one of said planting coulters has a plurality of serrated or notched outer blade surfaces.

20. A grass planting apparatus for use with a tractor or other motor vehicle and which is well suited for no till operation in the planting of warm season and other grasses, comprising:
    a frame member; at least one planting coulter rotatably mounted on said frame member; a feeder trough mounted on said frame member adjacent said planting coulter, said feeder trough having front and rear side walls and a bottom wall, one of said side walls having an opening therein to receive said planting coulter and with the bottom wall having an opening therein adjacent the planting coulter; and an agitator feeder having at least one elongated member rotatably mounted in said feeder trough, wherein said elongated member extends outwardly through said bottom wall opening during rotation.

21. A grass planting apparatus for use with a tractor or other motor vehicle and which is well suited for no till operation in the planting of warm season and other grasses, comprising:

a frame member; a plurality of front cutting coulters rotatably mounted on the front portion of said frame member; a plurality of rear planting coulters rotatably mounted on the rear portion of said frame member; a feeder trough mounted on said frame between the front and rear coulters, said feeder trough having front and rear side walls and a bottom wall, the rear side wall having openings therein to receive the planting coulters and with the bottom wall having an opening therein adjacent at least one planting coulter; an agitator feeder having two sets of kicker tines rotatably mounted in the feeder trough adjacent said at least one planting coulter, with one set of said kicker tines being mounted for rotation on one side of said at least one planting coulter, and with the other set of said kicker tines being mounted for rotation on the other side of said at least one planting coulter; and means for rotating said agitator feeder.

22. The grass planting apparatus of claim 21 wherein each set of kicker tines includes a three-spoke configuration with the spokes equally spaced at 120 degree angles.

* * * * *